United States Patent
Lemarchand

(10) Patent No.: US 9,863,325 B2
(45) Date of Patent: Jan. 9, 2018

(54) ASSEMBLY FOR AIRCRAFT TURBINE ENGINE AND METHOD FOR MOUNTING SAME

(71) Applicant: SAFRAN AIRCRAFT ENGINES, Paris (FR)

(72) Inventor: Kevin Morgane Lemarchand, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 14 days.

(21) Appl. No.: 15/306,913

(22) PCT Filed: Apr. 27, 2015

(86) PCT No.: PCT/FR2015/051131
§ 371 (c)(1),
(2) Date: Oct. 26, 2016

(87) PCT Pub. No.: WO2015/166178
PCT Pub. Date: Nov. 5, 2015

(65) Prior Publication Data
US 2017/0044988 A1    Feb. 16, 2017

(30) Foreign Application Priority Data

Apr. 29, 2014    (FR) ..................... 14 53889

(51) Int. Cl.
| F02C 7/36 | (2006.01) |
| F02C 7/32 | (2006.01) |
| F01D 25/16 | (2006.01) |
| F02C 7/06 | (2006.01) |

(Continued)

(52) U.S. Cl.
CPC .............. *F02C 7/32* (2013.01); *F01D 25/162* (2013.01); *F02C 3/04* (2013.01); *F02C 7/06* (2013.01);

(Continued)

(58) Field of Classification Search
CPC .... F02C 7/32; F02C 7/275; F02C 7/36; F02C 7/06; F02C 3/107; F01D 25/16;
(Continued)

(56) References Cited

U.S. PATENT DOCUMENTS

| 2,932,443 A | 4/1960 | Gunberg |
| 4,566,269 A * | 1/1986 | Gingras ................... F02C 7/32 |
| | | 60/226.1 |

(Continued)

FOREIGN PATENT DOCUMENTS

| EP | 1 911 938 A1 | 4/2008 |
| EP | 1 980 732 A2 | 10/2008 |

(Continued)

OTHER PUBLICATIONS

International Search Report dated Jul. 27, 2015 in PCT/FR2015/051131 filed Apr. 27, 2015.

(Continued)

*Primary Examiner* — William H Rodriguez
(74) *Attorney, Agent, or Firm* — Oblon, McClelland, Maier & Neustadt, L.L.P.

(57) ABSTRACT

An assembly for an aircraft turbine engine, including a rolling bearing bracket defining an inner space on either side thereof; a rotary assembly including a first gear; a housing for drawing mechanical power including a second gear mating with the first gear; a shaft for drawing mechanical power, inserted into the housing and rotated by the second gear, the shaft passing through a first opening of the bracket. The assembly includes a mounting device for mounting the housing on the bearing bracket, the mounting device passing through a second opening via the bracket, the mounting device passing through a second opening via the bracket, the second opening being configured so as to allow the housing to be inserted into the space.

10 Claims, 7 Drawing Sheets

(51) Int. Cl.
*F02C 3/04* (2006.01)
*F02K 3/06* (2006.01)

(52) U.S. Cl.
CPC .............. *F02C 7/36* (2013.01); *F02K 3/06* (2013.01); *F05D 2220/323* (2013.01); *F05D 2220/36* (2013.01); *F05D 2230/60* (2013.01); *F05D 2230/70* (2013.01); *F05D 2240/90* (2013.01); *F05D 2250/75* (2013.01); *F05D 2260/4031* (2013.01); *F05D 2260/40311* (2013.01); *Y02T 50/671* (2013.01)

(58) Field of Classification Search
CPC ............ F01D 25/162; F05D 2250/314; F05D 2240/50; F05D 2260/30; F05D 2250/50
See application file for complete search history.

(56) References Cited

U.S. PATENT DOCUMENTS

| | | | | |
|---|---|---|---|---|
| 2006/0248900 | A1* | 11/2006 | Suciu | F02C 7/32 60/802 |
| 2007/0199331 | A1* | 8/2007 | Maguire | F02C 3/107 60/796 |
| 2008/0173114 | A1 | 7/2008 | Charier et al. | |
| 2009/0064683 | A1 | 3/2009 | Moniz et al. | |
| 2009/0309461 | A1* | 12/2009 | Berenger | F02C 7/275 310/67 R |
| 2017/0044987 | A1* | 2/2017 | Curlier | F01D 25/162 60/802 |
| 2017/0051672 | A1* | 2/2017 | Nowakowski | F01D 25/162 60/802 |

FOREIGN PATENT DOCUMENTS

| | | | | |
|---|---|---|---|---|
| EP | 1980732 | A2 * | 10/2008 | ............ F02C 7/275 |
| FR | 2 946 091 | A1 | 12/2010 | |
| FR | 2 966 193 | A1 | 4/2012 | |

OTHER PUBLICATIONS

French Search Report dated Jan. 21, 2015 in FR 14 53889 filed Apr. 29, 2014.

* cited by examiner

ASSEMBLY FOR AIRCRAFT TURBINE ENGINE AND METHOD FOR MOUNTING SAME

TECHNICAL FIELD

The present invention relates to the field of assemblies for aircraft turbine engines, comprising a housing for taking off mechanical power, also referred to as the "IGB" ("inner gearbox").

The invention preferably applies to turbojet engines and turboprop engines. It applies particularly but not exclusively to bypass turbojet engines the fan of which is driven by a reduction gear.

PRIOR ART

On existing turbine engines, taking off mechanical power on the high-pressure drive shaft to drive a gearbox is known. The latter, also referred to as the "AGB" ("accessory gearbox"), is for example housed in an inter-duct compartment of the turbine engine, that is to say in a compartment situated radially between the primary channel and the secondary channel of the turbine engine. Such a configuration is for example known from the document FR 2 946 091.

Such a gearbox is conventionally formed by means of shafts carrying spur gears for rotating one another, and for driving the equipment with which they are associated. By way of indication, the equipment may be of the fuel pump, hydraulic pump, lubrication pump, alternator, starter or electric-power generator type.

For taking off mechanical power on the high-pressure drive shaft, a takeoff box is provided, referred to as the "IGB" or "inner gearbox". This box comprises a gear meshing with another gear, constrained to rotate with the high- or low-pressure drive shaft. The IGB in its turn rotates a mechanical-power takeoff shaft, for its part intended to drive the gearbox, normally via a transfer gearbox (TGB).

Whatever the configuration envisaged, the accessibility of the IGB of proves to be complicated and makes maintenance operations tricky. This is because, in order to have access to the IGB, it normally proves necessary to remove the fan wheel, any reduction gear, one or more rolling bearing brackets and possible the compressor. This of course complicates the maintenance operations.

There therefore exists a need to optimise the design of such turbine-engine assemblies, in particular to facilitate access to the IGB during maintenance operations.

DISCLOSURE OF THE INVENTION

The aim of the invention is therefore to propose a solution at least partially remedying the problems mentioned above, encountered in the solutions of the prior art.

To do this, the subject matter of the invention is an assembly for an aircraft turbine engine according to the features of claim 1.

The invention is advantageous in that it allows easy mounting and removal of the mechanical-power takeoff box, particularly advantageous in the context of maintenance operations. Effectively, once the takeoff shaft is extracted from the takeoff box by movement through the first opening in the bearing bracket, this box can be extracted from the radially inner space through the second opening in the bearing bracket provided for this purpose. The bearing bracket therefore does not need to be removed in order to allow access to the mechanical-power takeoff box, which facilitates removal of the latter. Naturally, when the box is to be remounted in the radially inner space, reverse operations are performed.

The invention moreover has at least one of the following optional features, taken in isolation or in combination.

Said bearing bracket comprises two portions inclined with respect to each other, respectively a first portion through which the second opening passes, and a second portion through which the first opening passes.

The first and second portions form a V in half-section preferably defining an inclination angle of approximately 90° between the two portions, even if other angles could be envisaged, without departing from the scope of the invention.

Said bearing bracket is produced using a plurality of parts mounted on one another. Alternatively, it may be a part in a single piece. Moreover, it should be noted that the aforementioned first and second portions are preferentially provided in a part in a single piece.

The takeoff shaft is mounted slidably in an orifice in the second gear. Preferably, this shaft is solely in axial abutment towards the bottom of the takeoff box, to facilitate extraction thereof during maintenance operations.

Said radially inner space corresponds to all or part of a lubrication enclosure in which said at least one rolling bearing is housed.

Said mounting means comprise means forming a cover closing off said second opening, and means of connection between the cover and the body of the power takeoff box, the connection means preferably passing through said second opening.

The rotor assembly comprises a fan hub intended to be driven directly by a low-pressure shaft of the turbine engine or by a reduction gear itself driven by this low-pressure shaft or by a high-pressure shaft. Alternatively, the power takeoff may be effected on any element of the turbine engine, belonging to the high-pressure body, to the low-pressure body or to an intermediate-pressure body. It is preferably any element of the low-pressure body or of the intermediate-pressure body, when such a body is present on the turbine engine. By way of indicative example, the power takeoff may be effected on the low-pressure shaft of the turbine engine.

Another subject matter of the invention is an aircraft turbine engine comprising an assembly as described above, preferably a bypass turbojet engine the fan of which is driven by a reduction gear.

Finally, a subject matter of the invention is a method for mounting such an assembly, comprising the following successive steps:
  introducing the power takeoff box into the radially inner space, from the radially outer space, via said second opening formed in the bearing bracket; and
  introducing the power takeoff shaft into the power takeoff box, from the radially outer space, by making it pass through said first opening formed in the bearing bracket.

Naturally, it should be noted that the reverse operations may be performed in order to remove the power-takeoff box during maintenance operations.

Other advantages and features of the invention will emerge from the following non-limitative detailed description.

BRIEF DESCRIPTION OF THE DRAWINGS

This description will be given with regard to the accompanying drawings, among which.

DETAILED DISCLOSURE OF PREFERRED EMBODIMENTS

Figure 1:
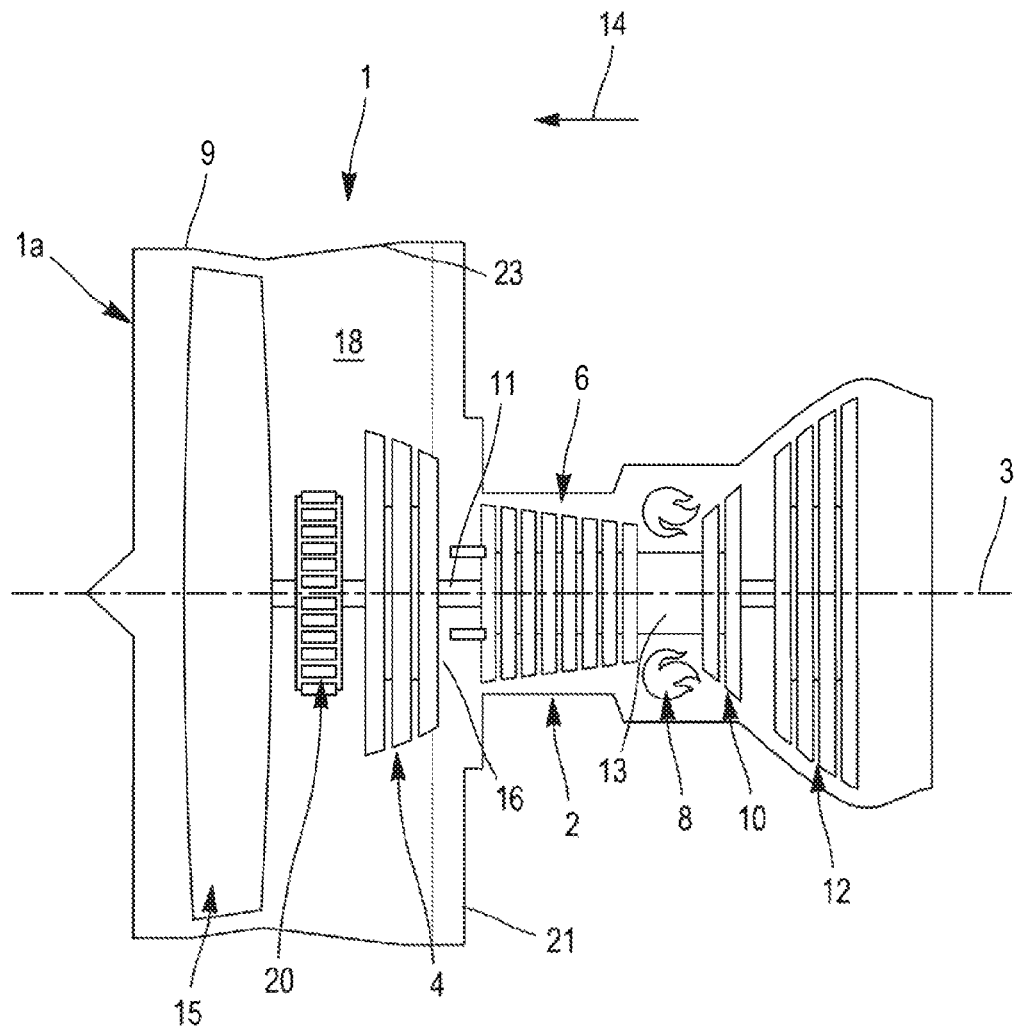
FIG. 1 depicts a schematic side view of a turbojet engine according to the invention.
Figure 2:
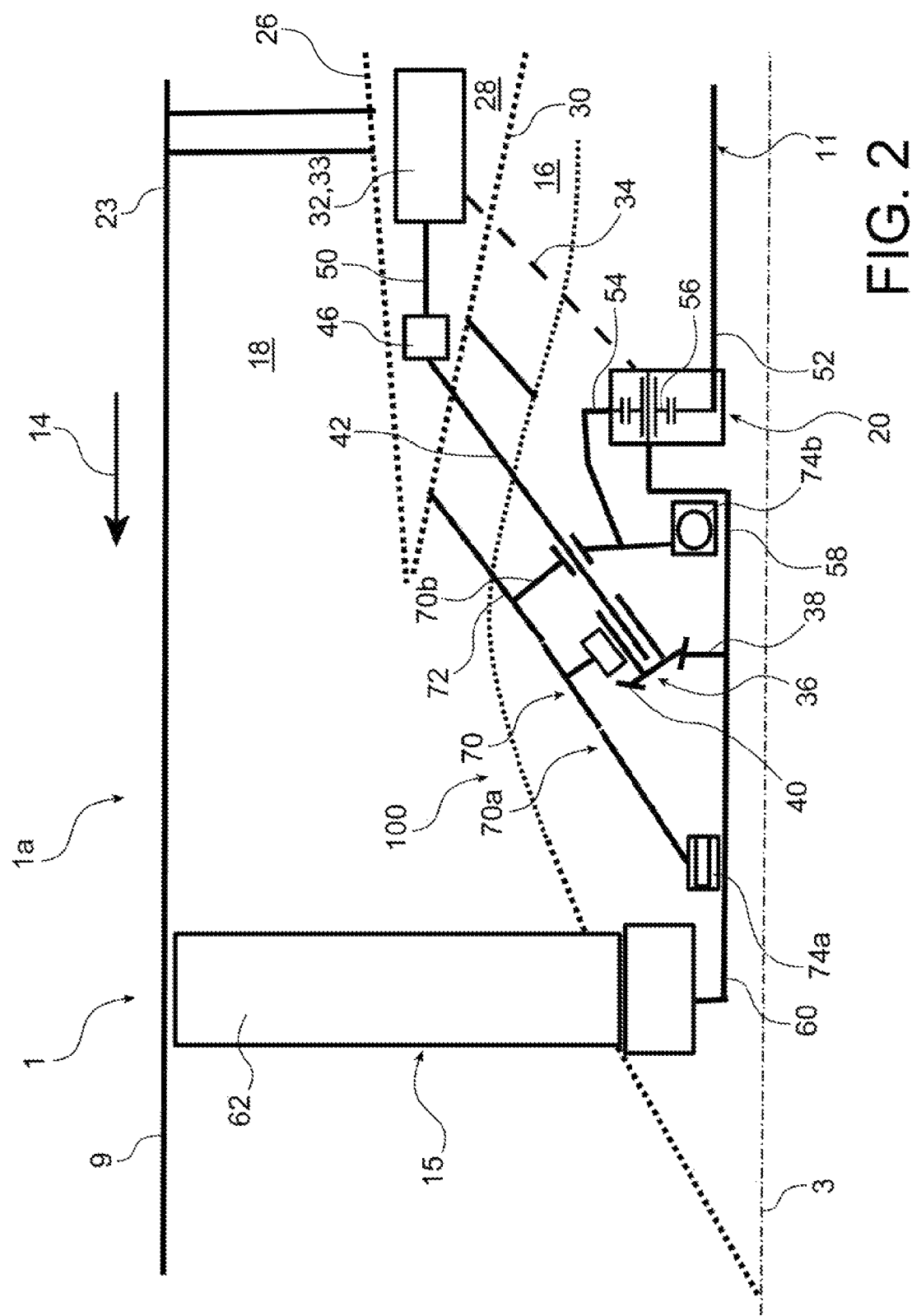
FIG. 2 depicts a more detailed enlarged view of a front part of the turbojet engine shell in the previous figure.

With reference first of all to FIGS. 1 and 2, a dual-body bypass turbojet engine 1 is shown, having a high dilution ratio. The turbojet engine 1, which has a front part referenced 1a in FIG. 2, comprises in a conventional fashion a gas generator 2 on either side of which there are arranged a low-pressure compressor 4 and a low-pressure turbine 12, this gas generator 2 comprising a high-pressure compressor 6, a combustion chamber 8 and a high-pressure turbine 10. Hereinafter, the terms "front" and "rear" are considered in a direction 14 opposite to the main direction of flow of the gases in the turbojet engine, this direction 14 being parallel to the longitudinal axis 3 thereof.

The low-pressure compressor 4 and low-pressure turbine 12 form a low-pressure body and are connected to each other by a low-pressure shaft 11 centred on the axis 3. Likewise, the high-pressure compressor 6 and the high-pressure turbine 10 form a high-pressure body and are connected to each other by a high-pressure shaft 13 centred on the axis 3 and arranged around the low-pressure shaft 11.

The turbojet engine 1 moreover comprises, in front of the gas generator 2 and low-pressure compressor 4, a fan 15. This fan rotates on the axis 3 and surrounds a fan casing 9. It is not driven directly by the low-pressure shaft 11 but only driven indirectly by the shaft, even if it could be otherwise, without departing from the scope of the invention. This is because a reduction gear 20 is arranged between the low-pressure body and the fan 15, being disposed axially between the latter and the low-pressure compressor 4. The presence of the reduction gear 20 for driving the fan 15 makes it possible to provide for a larger fan diameter and therefore assists the obtaining of a higher dilution ratio, providing a saving in fuel consumption.

Furthermore, the turbojet engine 1 defines a first channel 16 intended to have a primary flow pass through it, and a secondary channel 18 intended to have a secondary flow pass through it situated radially towards the outside with respect to the primary flow. As is known to persons skilled in the art, this secondary channel 18 is delimited radially towards the outside by an outer collar 23 of an intermediate casing 21. The latter also comprises a hub connected to the outer collar 23 by means of radial arms. The outer collar 23, preferentially metallic, extends the fan casing 9 towards the rear.

In addition, the secondary channel 18 is delimited radially towards the inside by an inner delimitation surface 26 also serving as an outer delimitation for an inter-duct compartment 28 visible in FIG. 2. This inter-duct compartment 28 is also delimited towards the front by the hub of the intermediate casing, and radially towards the inside by a collar 30 enclosing the low-pressure compressor 4 mentioned above.

In the turbojet engine 1, a gearbox 32 or an item of equipment of the turbojet engine requiring mechanical power is provided, this box hereinafter being referred to as the gearbox 32. It is placed in the inter-duct compartment 28, for example fixed to a downstream face of the hub of the intermediate casing. Nevertheless, this location may be different and this is the reason why, in FIG. 2, this gearbox 32 has simply been shown schematically in the inter-duct compartment 28, without any specific attachment.

Conventionally, and as indicated previously, the AGB 32 is formed by means of shafts carrying spur pinions for rotating one another, and for driving the equipment with which they are associated, preferably housed in the inter-duct compartment 28. Here only one compartment has been shown, schematically. This is an item of equipment 33 for supplying the gearbox 20 with lubricant, via a lubrication conduit 34. Nevertheless, other items of equipment are provided, such as for example of the fuel pump, hydraulic pump, alternator, starter or electric-power generator type.

For taking off mechanical power intended to supply the AGB 32, a takeoff box 36 is provided, hereinafter referred as the IGB. A first gear 38 centred on the axis 3 and driven by the fan 15 meshes with a second gear 40 of the IGB 36. The first gear 38 then corresponds to a power-takeoff gear, referred as the driving gear.

The second gear 40, referred to as the driven gear, houses a mechanical power takeoff shaft 42 that it rotates on the axis of the shaft, the latter preferably being inclined in the direction of the axis 3. The takeoff shaft 42 cooperates at its opposite end with a transfer gearbox 46, hereinafter referred to as the TGB, placed in the inter-duct compartment 28. Finally, in order to complete the kinematic chain between the TGB 46 and the AGB 32, a rotary transmission shaft 50 is provided.

The reduction gear 20 comprises an epicyclic gear chain. It should be noted that, conventionally, the train is said to be epicyclic when the ring is rotationally fixed, while it is said to be planetary when the planet carrier is rotationally fixed. Here, it composes first of all a sun gear 52 centred on the axis 3 and constrained to rotate with the low-pressure shaft 11, being arranged in forward alignment with this shaft 11. The two elements 11, 52 may be produced in a single piece, or preferably attached fixedly to each other. The epicyclic train moreover comprises an outer ring 54, secured to a stator of the turbojet engine. It is also provided with planet gears 56, meshing with the outer ring 54 and the sun gear 52. Finally, the epicyclic train comprises a planet-carrier shaft 58 constrained to rotate with a fan hub 60, also referred as the fan rotor, the latter carrying the fan blades 62 by means of a fan disc. Here also, the two elements 58, 60 can be produced in a single piece, or preferably attached fixedly to each other. In another possible configuration that is not shown, referred to as the sun train, the planet carrier shaft 58 is secured to the stator of the turbojet engine, and the outer ring 54 is constrained to rotate with the fan hub 60.

The aforementioned first gear 38, driving the IGB 36, is constrained to rotate with the fan hub 60, being fixed to the planet carrier 58 or to this fan hub 60, as shown schematically in FIG. 2. Thus, since the reduction gear 20 is driven by the low-pressure shaft 11, this reduction gear and the fan 15 can be considered to form part of the low-pressure body of the turbojet engine. The advantage lies here in the fact that, during an autorotation phase of the fan, in which all or part of the power generating the rotation of the low-pressure body comes from a source other than the high-pressure body, for example from the aerodynamic force applied to the blades of the fan, it is always possible to take off a minimum mechanical power therefrom. This is particularly advantageous in order to meet a vital need for lubrication of the reduction gear 20 during the autorotation of the fan. Particularly to reduce the mass and size of the reduction gear 20, the latter is designed with plain bearings (not shown in FIG. 2) supporting its rotary elements. Thus, in this advantageous design, the conventional rolling bodies of the rolling bearings are replaced by a film of oil, which has either a certain speed for bearings of the hydrodynamic type, or a certain pressure for bearings of the hydrostatic type. Consequently, during any autorotation of the fan, the design of the invention allows vital lubrication of these plain bearings, by virtue of the takeoff made on the first gear 38, which remains driven by the fan 15 in rotation. This is because the rotation of the fan 15 drives in a chain the rotation of the first gear 38, the rotation of the second gear 40, the rotation of the shafts 42, 50, the driving of the AGB 32, and finally the actuation of the equipment 33 causing the lubrication of the reduction gear 20, via the conduit 34. This lubrication prevents degradation of the films of oil on the plain bearings of this reduction gear, and thus ensures the correct functioning of the latter while prolonging its service life.

It should be noted that, in the case of autorotation of the fan, the lubrication of the reduction gear 20 is effectively provided in the manner disclosed above, but other conventional means could be provided in addition to ensure lubrication of this reduction gear outside any autorotation phase.

With reference now to FIGS. 2 to 5, an assembly 100 forming an integral part of the turbojet engine 1 is shown. The assembly 100 comprises first of all a rolling bearing bracket 70 connected to the casing internally delimiting the first channel 16 by means of a structural plate 72, shown only schematically in FIG. 2. The bearing bracket 70 therefore forms part of the stator of the turbojet engine 1. It is situated at the front of the reduction gear 20, and supports respectively two rolling bearings 74a, 74b at its two opposite axial ends. The two bearings guide a rotary assembly on the axis 3, intended to be driven by the gas generator 2, this assembly comprising the planet carrier 58 of the reduction gear, the hub 60 of the fan and the first gear 38. The first gear 38 is arranged axially between the two rolling bearings 74a, 74b.

Figure 3:
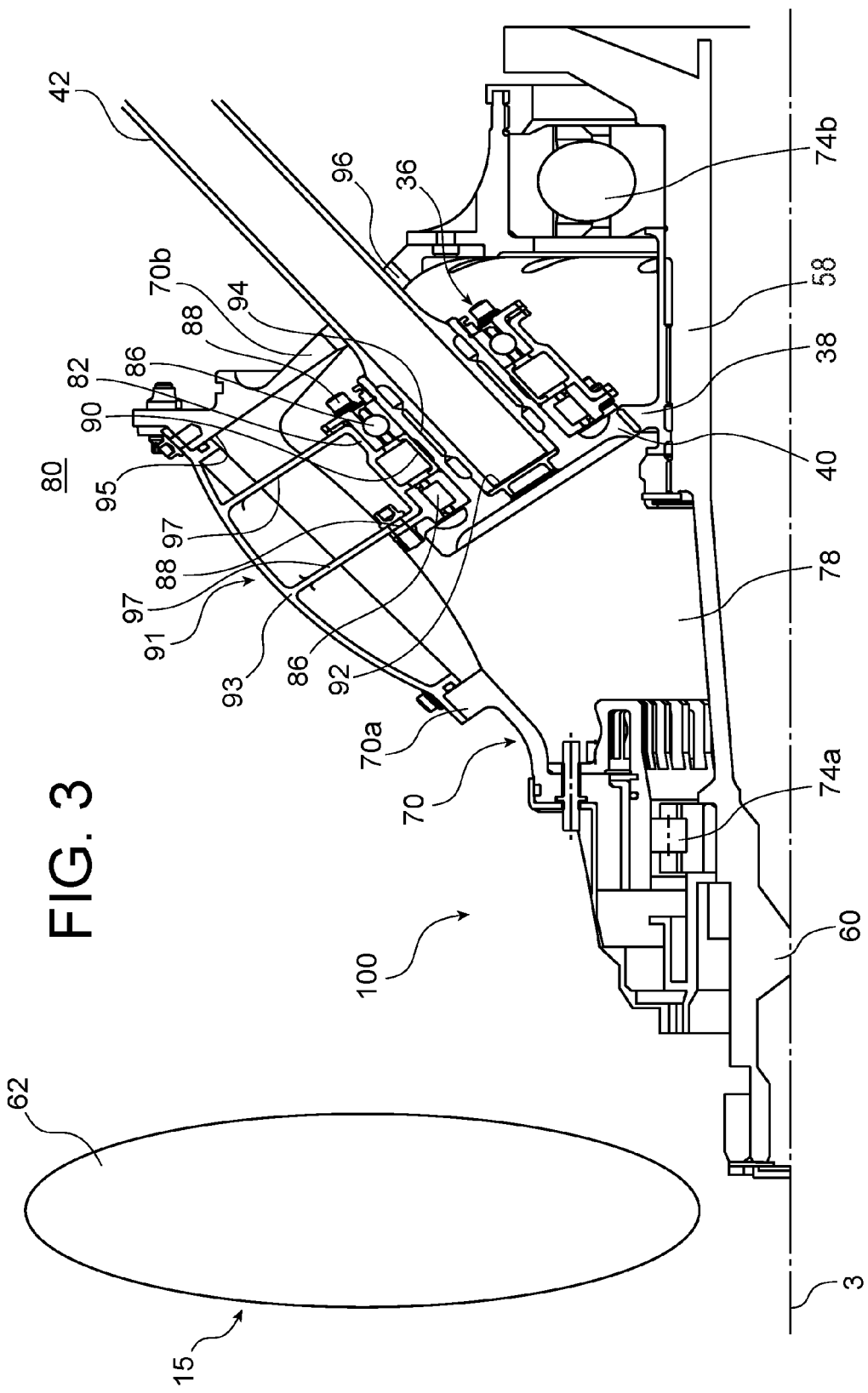
FIGS. 3 to 5 are detailed views of a front part of the turbojet engine shown in the previous figures, showing an assembly according to a preferred embodiment of the present invention.
Figure 4:
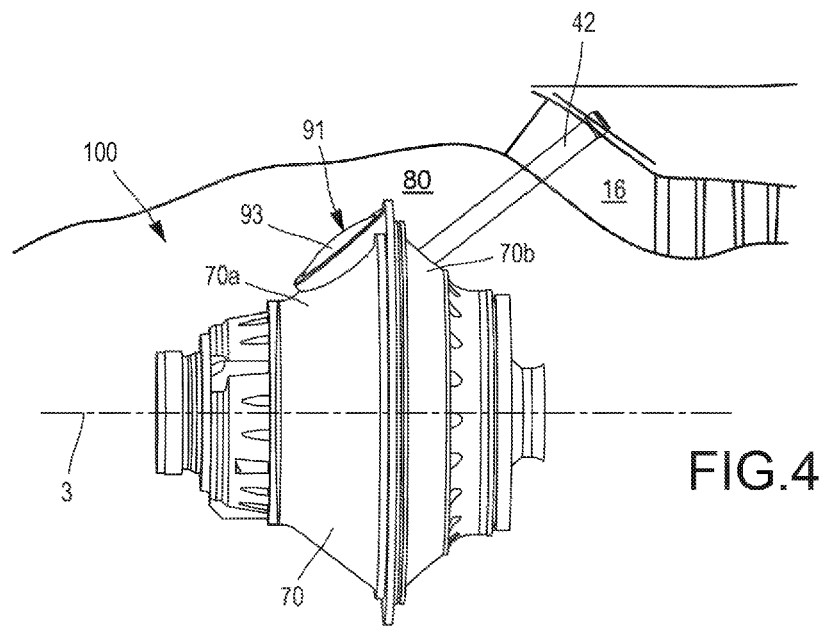
Figure 5:
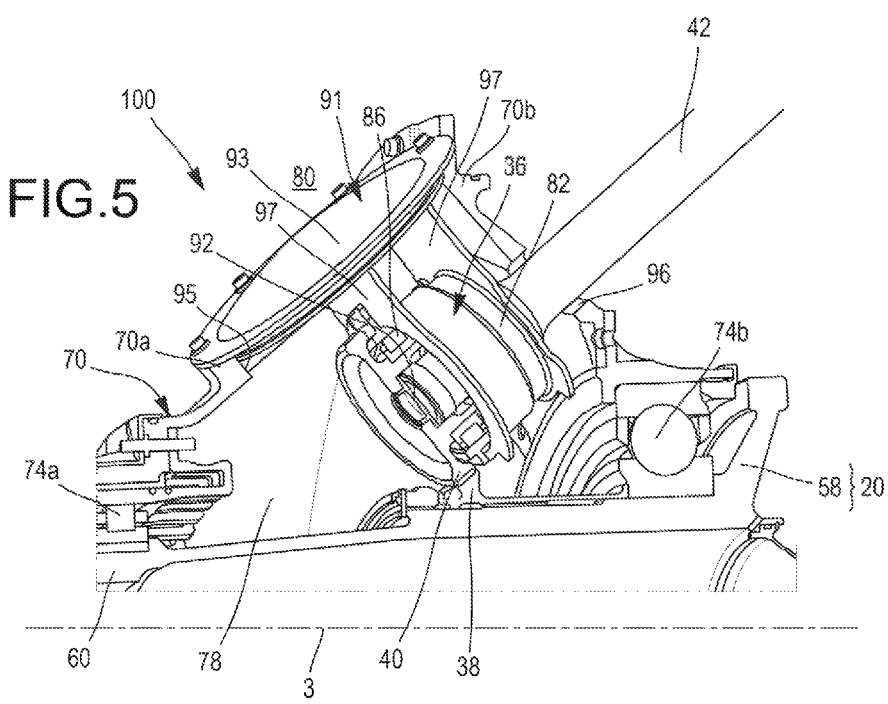

The bearing bracket 70 is centred on the axis 3. It delimits a radially inner space 78 in which the bearings 74a, 74b are placed and partly forms a lubrication enclosure. The support is produced by means of a part in a single piece, or a plurality of parts fixed to one another as shown in FIGS. 3 to 5. It is a case in fact of two parts attached to each other by axial bolts, the most rearward part, with the smallest size, carrying the roller bearing 74b supporting the planet carrier 58.

Together, the two parts of the bearing bracket 70 form first and second portions 70a, 70b, inclined with respect to each other. These two portions form a V in an axial half-section, the V being opened radially towards the inside and defining an angle of inclination of between 30° and 120° between the two portions, and preferably approximately 90°.

The aforementioned IGB 36 is also placed in the radially inner space 78, opposite to a radially outer space 80. In this regard, it is indicated that, on the same side as the front portion 70a of the bearing bracket 70, this outer space 80 is situated outside the lubrication enclosure, while, on the same side as the rear portion 70b of the bearing bracket 70, this outer space 80 forms part of the lubrication enclosure also including the radially inner space 78, the latter housing the first gear 38 and the second gear 40.

As indicated previously, the IGB 36 comprises the second gear 40, rotated by the first gear 38 secured to the planet carrier 58. The axes of these gears being inclined with respect to each other, bevel gears are used. The second gear 40 is carried by a fixed body 82, in which this same gear 40 is housed.

The IGB 36 will now be described more specifically with reference to FIGS. 3 and 5. Its body 82 is in the form of a jacket receiving the second gear 40, with bearings 86 interposed between these elements. The bearings 86 and the gear 40 are held on the body 82 by screwed elements 88, arranged at the axial ends of the IGB 36. More precisely, these screwed elements secure the outer races of the bearings 88 to the body 82. In addition, a strut 90 is provided between the inner races of the two bearings 88.

The second gear 40 defines internally a housing in which the front end of the shaft 42 is housed. The mounting is sliding, preferably so that this shaft is only in axial abutment in the bottom of the housing, that is to say in axial abutment against a bottom 92 defined by the gear 40. Thus this facilitates the operations of introducing and extracting the shaft 42 during maintenance operations. For the rotational driving of the shaft 42, the latter has a structured outer surface cooperating with the inner surface of the gear 40. A connection 94 of the fluted type can thus be used to achieve this rotational driving.

From its front end housed in the IGB 36, the takeoff shaft 42 extends towards the rear, and radially towards the outside as far as the TGB 46. To do this, it passes through a first opening 96 formed on the bearing bracket 70, and more precisely formed through the second portion 70b of this bracket. It next passes through the first channel 16 before being connected to the TGB 46. In this regard, it is indicated that the opening 96 emerges on either side in the radially inner space 78 and in the radially outer space 80.

Finally, the assembly 100 comprises means 91 for mounting the body 82 of the IGB 36 on the first portion 70a of the bearing bracket 70. These mounting means 91 comprise first of all means forming a cover 93, closing off a second opening 95 formed through the first portion 70a. In this regard, it is indicated that the second opening 95 is distinct from the first opening 96 and emerges on either side in the radially inner space 78 and in the radially outer space 80. For example, the opening 95 is provided on the portion 70a of the V while the opening 96 is provided on the other portion 70b of the V.

A sealed connection is provided between the support 70 and the cover 93 screwed onto this support in order to close off the lubrication enclosure or the radially inner space 78 in a satisfactory manner and to prevent leakage of oil and a pressure drop in the lubrication enclosure. The mounting means 91 also comprise means 97 of connection between the cover 93 and the body 82 of the IGB 36. These connection means 97 are formed here by two plates, for example produced in a single piece with the cover and/or with the body 82. These two plates are thus connected to the inner surface of the cover 93 and pass through the second opening 95 in the bracket. This second opening 95 is moreover configured so as to allow the introduction of the takeoff box into the radially inner space, as will now be described with reference to FIGS. 6a to 6f.

In these figures, various successive steps of a method for mounting the assembly 100 are in fact shown.

Figures 6A, 6B:
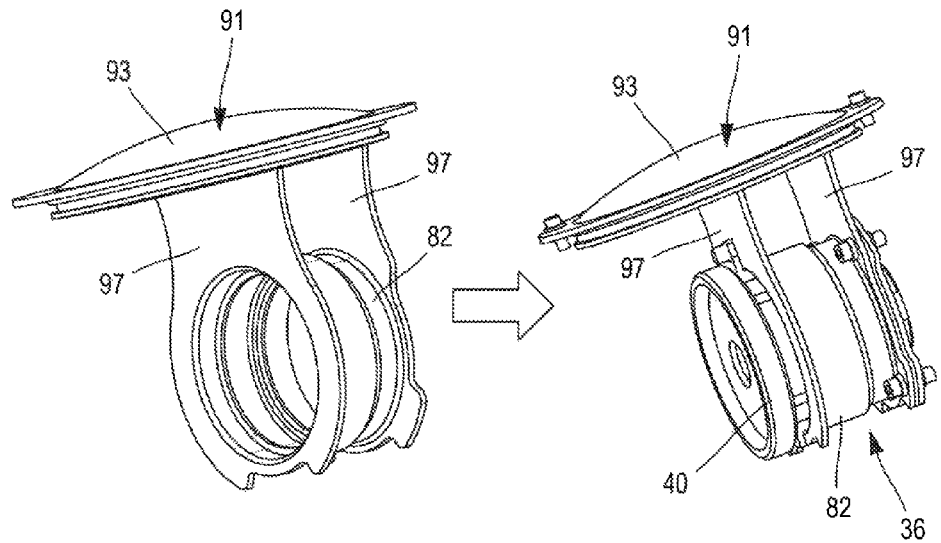
FIGS. 6a to 6f depict diagrammatic views of various steps of a method of mounting the assembly shown in FIGS. 3 to 5.
Figure 6B:
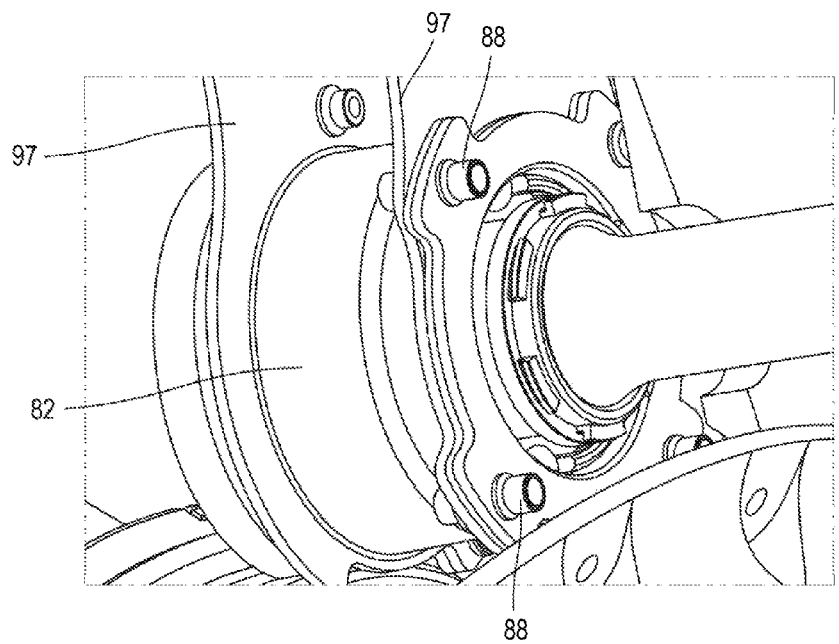

First of all, with reference to FIGS. 6a to 6b', the IGB 36 is assembled outside the turbojet engine, being mounted on its mounting means 91. To do this, the second gear 40 is placed in the body 82 with its associated bearings. The screwed elements 88 provide the assembly of the various elements of the IGB 36 and make it possible to obtain an assembly that can easily be manipulated by an operator, whether during manufacture of the turbojet engine or during a maintenance operation.

Figures 6C, 6D:
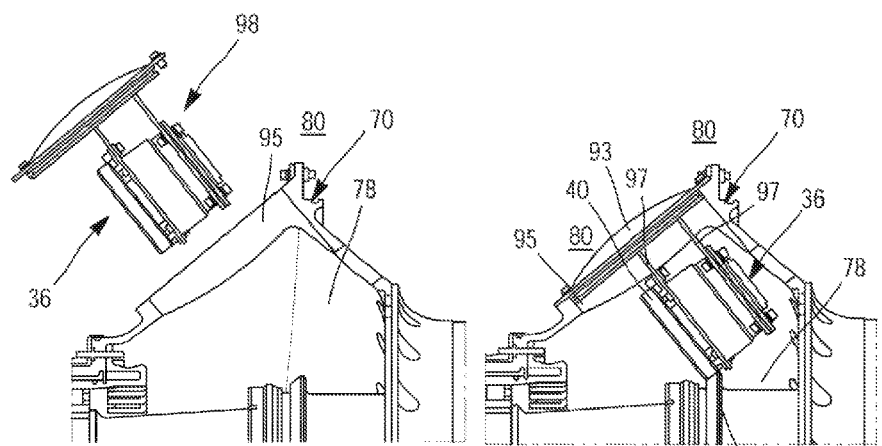

This assembly, referenced 98 in FIG. 6c, is next moved so that the IGB 36 is introduced into the radially inner space 78, passing through the second opening 95 in the bracket 70, sized accordingly. This introduction is continued until the cover 93 closes this opening, as depicted in FIG. 6d. Next the sealed fixing of the cover 93 on the bracket 70 is proceeded with, from the radially outer space 80, by screwing. In this position, the connecting plates 97 pass through the opening 95 and cause the second gear 40 of the IGB 36 to mesh with the first gear 38.

Figures 6E, 6F:
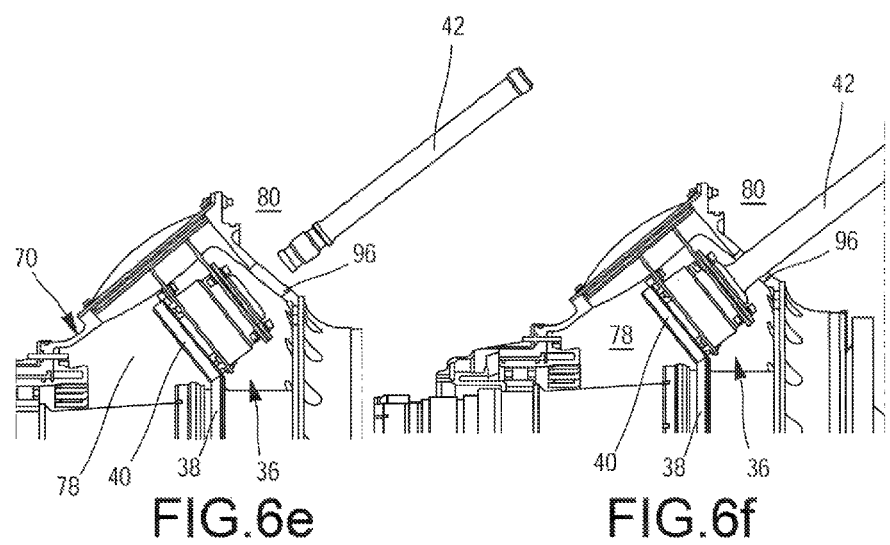

Next, the takeoff shaft 42 is introduced into the IGB 36, also from the radially outer space 80, as shown schematically in FIG. 6e. To do this, the shaft 42 passes through the first opening 96 formed through the second portion of the bracket 70. The shaft 42 is thus simply slid into the second gear 40, until it makes contact with the bottom, so as to reach the position depicted in FIG. 6f.

Thus it must be understood that the design adopted allows easy mounting and removal of the IGB 36, particularly advantageous in the context of maintenance operations. This is because, once the shaft 42 is extracted from the box by movement through the first opening 96 of the bearing bracket 70, this box can be extracted from the radially inner space 78 through the second opening 95 sized accordingly. The bearing bracket 70 therefore does not need to be removed to allow access to the IGB 36, which facilitates the removal of the latter. Moreover, it should be noted that, when the opening 95 is arranged on the top part of the engine, this makes it possible to open the lubrication enclosure without causing any leakage of oil, thus avoiding drainage of the chamber and facilitating the operation for the mechanics.

Naturally, when the box must be mounted in the radially inner space again, reverse operations are used.

Figure 7:
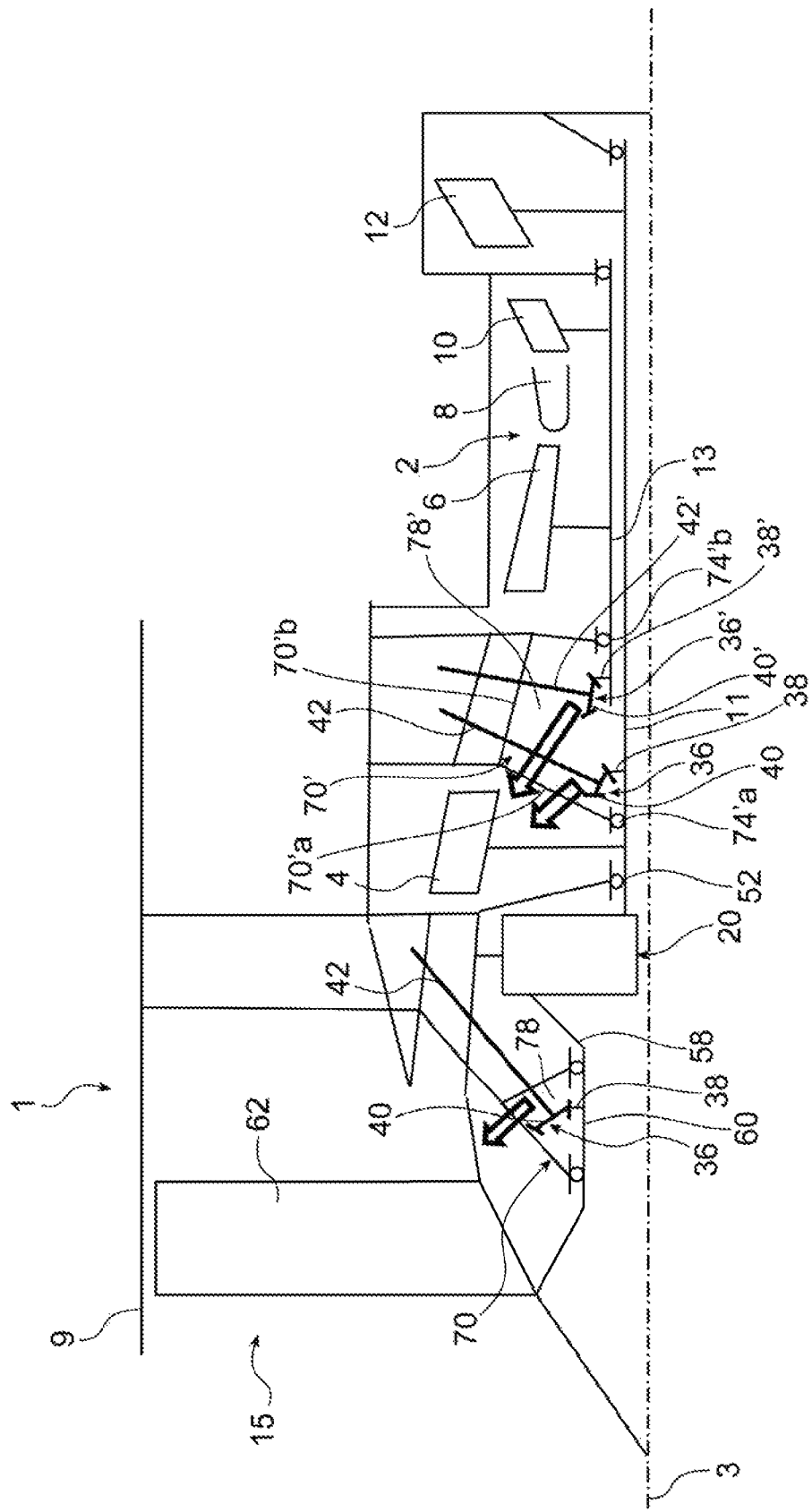
FIG. 7 depicts a view similar to that in FIG. 2, showing schematically various possible locations for the invention.

With reference now to FIG. 7, various possible locations for the invention are shown. It should be noted that the three distinct locations shown in this FIG. 7 may be adopted simultaneously, or only one or two of them.

The first location corresponds to the one shown in the previous figures, namely between the two rolling bearings 74a, 74b guiding the hub 60 of the fan 15.

According to another possibility, the first gear 38 is constrained to rotate with the sun gear 52, being fixed to the latter or to the low-pressure shaft 11. Preferably, the first gear 38 of the IGB 36 is fixed to the low-pressure shaft 11 and arranged axially between the low-pressure compressor 4 and the high-pressure compressor 6. Here, a bearing bracket 70' is provided, carrying at its upstream end a roller bearing 74'a supporting the low-pressure shaft 11, and carrying at its downstream end a roller bearing 74'b supporting the high-pressure shaft 13. The bracket 70' is also in the form of a V, with an upstream portion 70'a and a downstream portion 70'b. The IGB 36 is intended to be introduced into the radially inner space 78', forming a lubrication enclosure, through an opening (not shown) in the upstream portion 70'a. Equally, the takeoff shaft 42 passes through an opening (not shown) present on the upstream portion 70'b. The operations of mounting and removing the IGB 36 are similar to those described with reference to the previous figures for the first location.

The third possible location of the invention is also situated in the radially inner space 78', delimited by the bearing bracket 70'. This is because another IGB 36' is provided, the second wheel 40' of which is driven by a first gear 38' arranged in a more conventional manner, namely constrained to rotate with the high-pressure body. More precisely, the first gear 38' is fixed to the high-pressure shaft 13 and meshes with the second gear 40' driving another power takeoff shaft 42' connected to the AGB via a takeoff shaft 42', optionally via another TGB (not shown). Here also, the IGB 36' is intended to be introduced into the radially inner space 78' through another opening (not shown) in the upstream portion 70'a, while the takeoff shaft 42' passes through another opening (not shown) present on the downstream portion 70'b. The operations of mounting and removing the IGB 36' are also similar to those described with reference to the previous figures. In this regard, it should be noted that, in FIG. 7, the arrows show diagrammatically the direction of removal of the IGBs in the case of maintenance operations, for the three locations envisaged.

In the case where several of the possible locations are adopted, control means may be provided, configured to provide simultaneous and/or alternative takeoffs via the IGBs 36, 36, 36', according to predetermined parameters.

Naturally various modifications can be made by persons skilled in the art to the invention that has just been described solely by way of non-limitative examples.

The invention claimed is:

1. An assembly for an aircraft turbine engine, comprising:
    a roller bearing bracket delimiting, on either side thereof, a radially inner space and a radially outer space;
    at least one roller bearing housed in said radially inner space and carried by said bearing bracket;
    a rotary assembly configured to be rotated by a gas generator of the turbine engine, said rotary assembly rotating on a longitudinal axis of the turbine engine and comprising a first gear and being carried by said at least one roller bearing, said first gear being arranged in said radially inner space;
    a mechanical power takeoff box housed in the radially inner space and comprising a second gear meshing with the first gear, the mechanical power takeoff box comprising a body rotationally housing said second gear arranged in said radially inner space;
    a mechanical power takeoff shaft inserted in the mechanical power takeoff box and rotated by said second gear, the takeoff shaft being distinct from said rotary assembly and passing through a first opening in the bearing bracket and being configured to drive an accessory box or one or more items of equipment of the turbine engine, said first opening emerging on either side in said radially inner space and in said radially outer space,
    wherein means for mounting the mechanical power takeoff box on the bearing bracket, said mounting means passing through a second opening through the bearing bracket, said second opening, distinct from the first opening, emerging on either side in said radially inner space and in said radially outer space, and being configured so as to allow the introduction of said takeoff box in said radially inner space.

2. The assembly according to claim 1, wherein said bearing bracket comprises two portions inclined with respect to each other, respectively a first portion with the second opening passing through it, and a second portion with the first opening passing through it.

3. The assembly according to claim 2, wherein the first and second portions form a V in a half-section, defining an angle of inclination of approximately 90° between the two portions.

4. The assembly according to claim 1, wherein said bearing bracket is produced from a plurality of parts mounted on one another.

5. The assembly according to claim 1, wherein the takeoff shaft is mounted so as to slide in an orifice in the second gear.

6. The assembly according to claim 1, wherein said radially inner space corresponds to all or part of a lubrication enclosure in which said at least one roller bearing is housed.

7. The assembly according to claim 1, wherein said mounting means comprise means forming a cover closing off said second opening, and means of connection between the cover and the body of the power takeoff box, the connection means passing through said second opening.

8. The assembly according to claim 1, wherein the rotary assembly comprises a fan hub configured to be driven directly by a low-pressure shaft of the turbine engine or by a reducing gear itself driven by said low-pressure shaft or by a high-pressure shaft.

9. An aircraft turbine engine comprising an assembly according to claim 1.

10. A method for mounting an assembly according to claim 1, wherein the following successive steps:
- introducing the power takeoff box into the radially inner space, from the radially outer space, via said second opening formed in the bearing; and
- introducing the power takeoff shaft into the power takeoff box, from the radially outer space, causing it to pass through said first opening formed in the bearing bracket.

* * * * *

UNITED STATES PATENT AND TRADEMARK OFFICE
CERTIFICATE OF CORRECTION

PATENT NO. : 9,863,325 B2
APPLICATION NO. : 15/306913
DATED : January 9, 2018
INVENTOR(S) : Kevin Morgane Lemarchand It is certified that error appears in the above-identified patent and that said Letters Patent is hereby corrected as shown below:

In the Specification

Column 8, Line 20, change "36, 36, 36'" to --36, 36'--.

Signed and Sealed this
Eleventh Day of December, 2018

Andrei Iancu
*Director of the United States Patent and Trademark Office*